United States Patent
Beliciu et al.

(10) Patent No.: US 10,806,165 B2
(45) Date of Patent: Oct. 20, 2020

(54) READY-TO-DRINK PLANT PROTEIN BEVERAGE PRODUCT AND METHODS FOR MAKING SAME

(71) Applicant: Stokely-Van Camp, Inc., Chicago, IL (US)

(72) Inventors: Cosmin Beliciu, Ithaca, NY (US); Douglas Bolster, Denver, CO (US); Jaydeepsinh Chauhan, Barrington, IL (US); Shellen Goltz, Chicago, IL (US); Alison Kamil, Chicago, IL (US); Catalin Moraru, Ithaca, NY (US); Ricardo Pereyra, White Plains, NY (US); Malcond Valladares, Ithaca, NY (US)

(73) Assignee: Stokely-Van Camp, Inc., Chicago, IL (US)

( * ) Notice: Subject to any disclaimer, the term of this patent is extended or adjusted under 35 U.S.C. 154(b) by 234 days.

(21) Appl. No.: 15/961,289

(22) Filed: Apr. 24, 2018

(65) Prior Publication Data
US 2019/0320689 A1  Oct. 24, 2019

(51) Int. Cl.
*A23L 2/66* (2006.01)
*A23L 2/60* (2006.01)
(Continued)

(52) U.S. Cl.
CPC  *A23L 2/66* (2013.01); *A23L 2/60* (2013.01); *A23L 33/185* (2016.08); *A23L 33/19* (2016.08);
(Continued)

(58) Field of Classification Search
CPC ......... A23L 2/66; A23L 33/19; A23L 33/185; A23L 2/60
(Continued)

(56) References Cited

U.S. PATENT DOCUMENTS 4,309,417 A  *  1/1982  Staples
7,101,585 B2     9/2006  Shen et al.
(Continued)

FOREIGN PATENT DOCUMENTS

WO  2010126353 A1  11/2010

OTHER PUBLICATIONS

Optimum Nutrition Gold Standard 100% Plant-Based Protein Review, Plant Based Pros, Nov. 7, 2017, www.plantbasedpros.com/optimum-nutrition-gold-standard-100-plant-based-protein-review/.
(Continued)

*Primary Examiner* — Helen F Heggestad
(74) *Attorney, Agent, or Firm* — G. Peter Nichols; Barnes & Thornburg LLP

(57) ABSTRACT

Ready-to-drink beverages comprise a significant amount of complete protein per 8 fluid-ounce serving, the proteins derived from a plant protein blend comprising a legume protein, a whole grain protein, and a dairy or wheat protein. Other components added include a sweetening component, a flavor component, hydrocolloids, and optionally maltodextrin to produce a ready-to-drink beverage with no visible sedimentation and good taste and mouthfeel. The components are subjected to a high temperature treatment step, followed by a homogenizing step. Formulations provide for source of high quality, complete protein.

15 Claims, 2 Drawing Sheets

(51) Int. Cl.
*A23L 33/19* (2016.01)
*A23L 33/185* (2016.01)

(52) U.S. Cl.
CPC ... *A23V 2002/00* (2013.01); *A23V 2250/5114* (2013.01); *A23V 2250/5424* (2013.01); *A23V 2250/5482* (2013.01); *A23V 2250/5486* (2013.01); *A23V 2300/24* (2013.01); *A23V 2300/26* (2013.01)

(58) Field of Classification Search
USPC .................................... 426/615, 590, 656
See application file for complete search history.

(56) References Cited

U.S. PATENT DOCUMENTS

| | | | |
|---|---|---|---|
| 7,799,363 | B2 | 9/2010 | Sherwood et al. |
| 8,754,088 | B2 | 6/2014 | Shigemura et al. |
| 8,869,736 | B2 | 10/2014 | Scudieri et al. |
| 8,877,922 | B2 | 11/2014 | Tachdjian et al. |
| 9,138,007 | B2 | 9/2015 | DeWaele et al. |
| 9,717,267 | B2 | 8/2017 | Prakash et al. |
| 2008/0050498 | A1 | 2/2008 | Sherwood et al. |
| 2009/0317533 | A1* | 12/2009 | Herrmann |
| 2011/0159165 | A1 | 6/2011 | Nair et al. |
| 2011/0250313 | A1* | 10/2011 | Hwang et al. |
| 2011/0311599 | A1* | 12/2011 | Boursier et al. |
| 2012/0258236 | A1 | 10/2012 | Cruz Serna et al. |
| 2012/0288588 | A1 | 11/2012 | Barron |
| 2013/0344201 | A1* | 12/2013 | Sherwood et al. |
| 2014/0272068 | A1 | 9/2014 | Prakash et al. |

OTHER PUBLICATIONS

Optimum Nutrition. "Optimum Nutrition Gold Standard 100% Organic Plant Based Vegan Protein Powder, Vanilla." Amazon, Amazon, 2016, www.amazon.com/Optimum-Nutrition-Standard-Organic-Servings/dp/B075KGR37C?th=1.
Nutrition53. "The Best Fat Burning Meal Replacement!" Nutrition 53, Nutrition 53, 2013, www.nutrition53.com/pages/lean1.
Krefting, Jessica. "The Appeal of Pea Protein," Journal of Renal Nutrition, vol. 27, No. 5, 2017, doi:10.1053/jrn.2017.06.009.
Brinkely, "How to Mix Protein Powder." livestrong.com, Leaf Group, Apr. 18, 2018, www.livestrong.com/article/251559-how-to-mix-protein-powder/.
Meneses et al. "Evaluation Biologica De La Calidad De Una Mezcla De Proteinas Para Uso En Nutricion Enteral." Nutricion Hospitalaria, vol. 23, No. 3, 2008, pp. 206-211.
International Search Report & Written Opinion of PCT/US2019/28723 dated Aug. 7, 2019.
So Delicious Dairy Free | Almondmilk Beverages | Vanilla, located at http://sodeliciousdairyfree.com/products/almond-plus-almond-milk-beverages/vanilla—(1 page).
So Delicious Dairy Free | Almondmilk Beverages | Unsweetened, located at http://sodeliciousdairyfree.com/products/almond-plus-almond-milk-beverages/unsweetened—(1 page).
AXIOM Foods, Oryzatein SG-B/N information sheet (1 page).
DREAM Boosted Original Almond Beverage | Dream Plan Based, located at http://www.dreamplantbased.com/product/boosted-original-almond-beverage/ (4 pages).
GLANBIA Nutritionals NutraSol 584 Product Data (Preliminary) Sheet (1 page).
MGP Technical Data Sheet on Optein (1 page).
AXIOM Foods Veg-o-Tein p. 80 data sheet (1 page4).
RIPPLE Foods Original Dairy-Free Plant-Based Milk, located at http://ripplefoods.com/original-plant-milk/ (7 pages).
RIPPLE Foods Original Unsweetened Dairy-Free Plant-Based Milk, located at http://ripplefoods.com/original-unsweetened-plant-milk/ (7 pages).
AXIOM Foods Incatein Product Overview (3 pages).
CALIFIA Vanilla Protein nutritional sheet located at http://www.califiafarms.com/products/almondmilk/vanilla-protein (2 pages).
RIPPLE Foods Healthy Living With Plant Based Milk, located at https://www.ripplefoods.com/healthy-living (9 pages).
Written Opinion of the International Preliminary Examining Authority in PCT/US2019/028723 dated Dec. 13, 2019.
So Delicious Dairy Free | Almondmilk Beverages | Vanilla, located at http://sodeliciousdairyfree.com/products/almond-plus-almond-milk-beverages/vanilla (1 page) [retrieved before Apr. 24, 2018].
So Delicious Dairy Free | Almondmilk Beverages | Unsweetened, located at http://sodeliciousdairyfree.com/products/almond-plus-almond-milk-beverages/unsweetened (1 page) [retrieved before Apr. 24, 2018].
AXIOM Foods, Oryzatein SG-B/N information sheet (1 page), Apr. 11, 2013.
DREAM Boosted Original Almond Beverage | Dream Plan Based, located at http://www.dreamplantbased.com/product/boosted-original-almond-beverage/ (4 pages), 2016.
GLANBIA Nutritionals NutraSol 584 Product Data (Preliminary) Sheet (1 page) [retrieved before Apr. 24, 2018].
MGP Technical Data Sheet on Optein (1 page), Apr. 17, 2015.
AXIOM Foods Veg-o-Tein p. 80 data sheet (1 page), dated May 13, 2013.
RIPPLE Foods Original Dairy-Free Plant Based Milk, located at http://ripplefoods.com/original-plant-milk (7 pages), 2016.
RIPPLE Foods Original Unsweetened Dairy-Free Plant-Based Milk, located at http://ripplefoods.com/original-unsweetened-plant-milk/ (7 pages), 2016.
AXIOM Foods Incatein Product Overview (3 pages), dated Dec. 6, 2012.
CALIFIA Vanilla Protein nutritional sheet located at http://www.califiafarms.com/products/almondmilk/vanilla-protein (2 pages) [retrieved before Apr. 24, 2018].
RIPPLE Foods Healthy Living With Plant Based Milk, located at https://www.ripplefoods.com/healthy-living (9 pages), Apr. 13, 2018.

* cited by examiner

READY-TO-DRINK PLANT PROTEIN BEVERAGE PRODUCT AND METHODS FOR MAKING SAME

BACKGROUND OF THE INVENTION

Technical Field

The present invention relates to beverages comprising a good source of high quality plant proteins.

Description of Related Art

The flavor of beverages is continuously modified to deliver new and desirable tastes to consumers. Beverages are also modified to include more diversity of nutrition for consumers. Typically, inclusion of significant amounts of plant proteins into beverages is difficult due to a wide variety of issues, including sedimentation, phase separation, gelation, discoloration, interactions with calcium/cations, pH stability, and temperature stability, combined with the desire to deliver good taste while balancing all the other challenges. There is a need for beverages with a high amount of plant proteins and desirable mouthfeel with little to no sedimentation problems. It is desirable to include proteins of high quality, based on both the amino acid require r requirements of humans and their ability to digest it. The present disclosure addresses these and other challenges and provides for desirable, ready-to-drink liquid formulations containing significant amounts of high quality proteins.

SUMMARY OF THE INVENTION

Provided herein is a method for improving upon beverage products to provide for ready-to-drink beverage products or formulations having a significant amount of complete high quality protein per serving, good mouthfeel and desirable taste. More specifically, a beverage product comprises up to 10 grams of complete protein per 8 ounces. Further description of the enhanced beverage product and method for making same will become apparent in the below written detailed description.

In a first aspect, the beverage products described herein comprise a plant protein blend of at least three proteins: a legume protein, a whole grain protein, and one of: a dairy protein or a wheat protein. In some embodiments, the plant protein blend and beverage product comprises substantially equal amounts of the legume protein and the whole grain protein. In one embodiment, the beverage product comprises up to about 5% legume protein. In one embodiment, the beverage comprises up to about 5% whole grain protein. In one embodiment, the beverage product comprises up to about 1.5% dairy protein. In one embodiment, the beverage product comprises the legume protein, the whole grain protein, the wheat protein, and an additional protein derived from sacha inchi. In some embodiments, the beverage products comprise a sweetening component. A flavoring component is added to some embodiments of the beverage. Additional components such as hydrocolloids, buffering salts, and stabilizing components are present in other embodiments.

In a second aspect, a method of making a beverage product comprises the steps of: mixing a plant protein blend with a sweetening component to form a dry blend, the plant protein blend comprising a legume protein, a whole grain protein, and a dairy protein or a wheat protein; hydrating the dry blend; mixing the hydrated dry blend to form a beverage base; subjecting the beverage base to a high temperature treatment to soften a plant matrix of the plant protein blend; homogenizing the beverage base at temperatures of at least about 190° F.; and cooling the beverage base.

Other aspects, embodiments and features of the invention will become apparent in the following written detailed description.

BRIEF DESCRIPTION OF THE DRAWINGS

The novel features believed characteristic of the invention are set forth in the appended claims. The invention itself, and further objectives and advantages thereof, will be best understood by reference to the following detailed description when read in conjunction with the accompanying drawings, wherein:

DETAILED DESCRIPTION OF THE INVENTION

Figure 1:
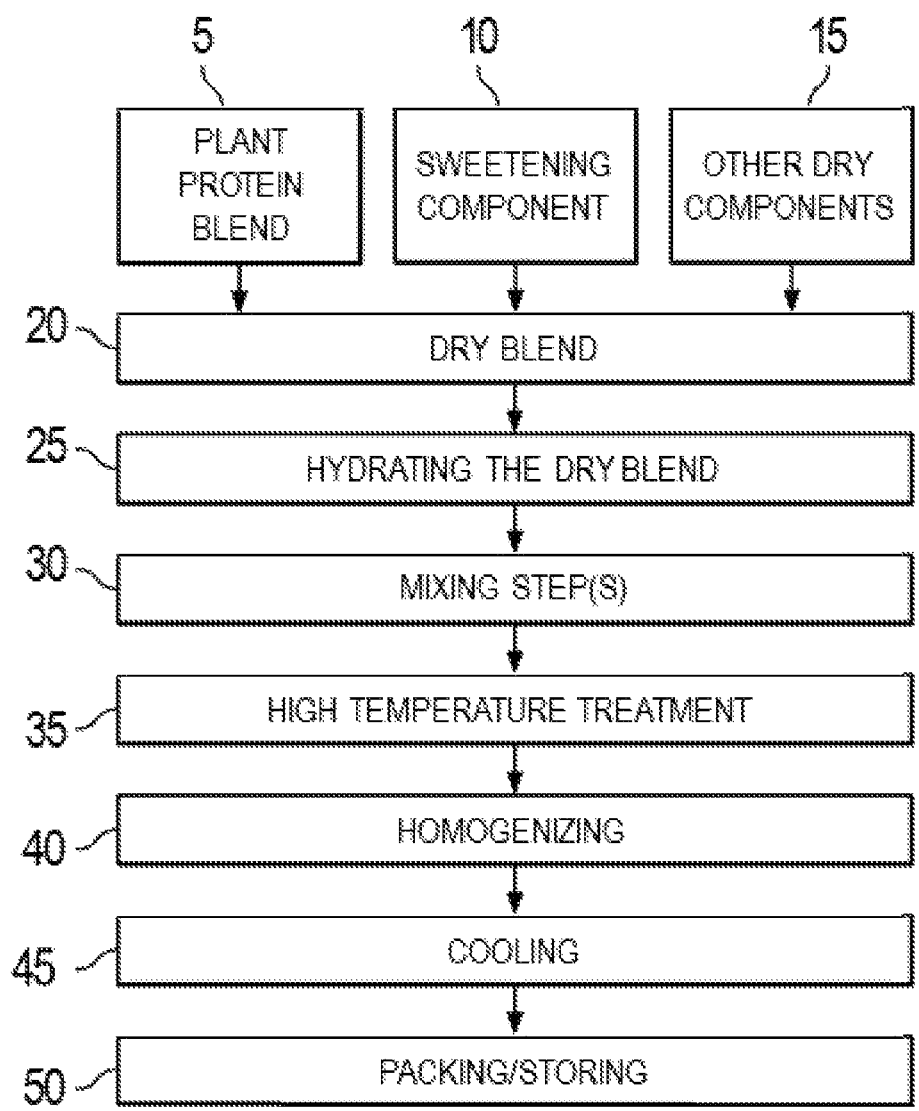
FIG. 1 depicts a flow chart of one embodiment for making a beverage product as described herein.

Plant proteins are more challenging to process than typical dairy ingredients due to several factors. Plant proteins comprise more non-protein solids and lower solubility, as proteins are still entrapped in plant tissue matrix. These proteins also typically comprise a lower PDCAAS value and are thus difficult to formulate to 10 grams of complete protein per serving. Taste and flavor are often overpowered by strong 'green' notes and notes specific to the plant of origin, making masking of undesirable flavor difficult. Using the plant protein blends and methods described herein, the inventors were able to produce beverages having a good mouthfeel and balance of flavor and sweetness levels.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. The terms "including," "comprising," "having," and variations thereof mean "including but not limited to," unless expressly specified otherwise. When used in the appended claims, in original and amended form, the term "comprising" is intended to be inclusive or open-ended and does not exclude any additional, unrecited element, method, step or material. The term "consisting of" excludes any element, step or material other than those specified together with the phrase.

As used herein, "nutritive sweetener" refers generally to a sweetener that provides significant caloric content in typical usage amounts, e.g., more than about 5 calories per 8 oz. serving of a beverage. The term "non-nutritive sweetener" refers to a sweetener other than a nutritive sweetener.

As used herein, "taste" refers to a combination of sweetness perception, temporal effects of sweetness perception, i.e., on-set and duration, off-tastes, e.g. bitterness and metallic taste, residual perception (aftertaste), and tactile perception, e.g. body and thickness.

The term "ready-to-drink" refers to a beverage formulated to be ingested as-is. Thus, the ready-to-drink beverage requires no dilution or additions prior to ingestion by a consumer. In some embodiments, the ready-to-drink beverage provided by the methods described herein is a non-syrup based beverage.

The beverage products include, for example, juice beverages (e.g., beverages comprising one or more fruit juices and/or one or more vegetable juices), hydration beverages such as those with added electrolytes, sports drinks, flavored waters, frozen or chilled beverages, caffeinated beverages, carbonated beverages, non-carbonated beverages, and zero to low calorie drinks (for example, 0-150 kcals and up to 10 grams sugar/12 oz.), such as diet or other reduced calorie beverages. In certain embodiments, the beverage product can be any of carbonated and non-carbonated soft drinks, fountain beverages, refrigerated ready-to-drink beverages, coffee, tea, and other brewed beverages, dairy beverages, enhanced waters, fruit juice such as orange juice (including diluted and ready to drink concentrated juices), fruit juice-flavored drinks, smoothies, functionally enhanced beverages such as caffeinated energy drinks, and alcoholic products. In particular embodiments, the beverage can be a cola beverage. In some embodiments, the ready-to-drink beverage product is free of citrus and/or citrus flavor. In some embodiments, the ready-to-drink beverage product is free of caffeine (i.e., 0% caffeine). In some embodiments, the ready-to-drink beverage product is free of carbonation.

A method for making the beverage products described herein will now be described with reference to FIG. 1. In the preparation of a raw beverage base to undergo treatment to produce a ready-to-drink beverage product, a plant protein blend 5 is mixed with a sweetening component 10 to form a dry blend 20. In some embodiments, the dry blend 20 may also comprise additional components 15, such as one or more buffering salts and/or stabilizers, which will be further described below.

The plant protein blend 5 should comprise at least three proteins: a legume protein, a whole grain protein, and a dairy protein or a wheat protein. In some embodiments, the plant protein blend comprises a ratio of legume protein to whole grain protein of about 1:1, or substantially equal amounts of the legume protein and the whole grain protein. In some embodiments, the plant protein blend comprises between about 30% and about 38% legume protein. In some embodiments, the plant protein blend comprises between about 30% and about 38% whole grain protein. In some embodiments, the plant protein blend comprises the legume protein, the whole grain protein, and the dairy protein, the dairy protein present in an amount of between about 35% and about 40%. In some embodiments, the plant protein blend consists of the legume protein, the whole grain protein, and the dairy protein. In some embodiments, the plant protein blend consists of any suitable legume, whole grain or dairy protein as recited in this description. In some embodiments, the plant protein blend comprises the legume protein, the whole grain protein, the wheat protein, and a sacha inchi protein, wherein the legume protein and the whole grain protein are present in substantially equal amounts. In some embodiments, the plant protein blend consists of the legume protein, the whole grain protein, the wheat protein, and a sacha inchi protein. In any embodiment including a combination of the wheat protein with the sacha inchi protein, the wheat protein may be present in an amount ranging from about 14% to about 18%. In any embodiment including a combination of the wheat protein with the sacha inchi protein, the sacha inchi protein may be present in an amount of from about 10% to about 15%. All percentages used in this paragraph are based on the total weight of the plant protein blend. As used herein, plant proteins refer to plant proteins isolated, derived, or concentrated in a dry form.

The legume protein generally comprises a protein derived from chickpea, lentil, lupin, pea, or any combination thereof. In some embodiments, the legume protein comprises a chickpea protein. In some embodiments, the legume protein comprises a lentil protein. In some embodiments, the legume protein comprises a lupin protein. In some embodiments, the legume protein comprises a pea protein. In some embodiments, the legume protein consists of a chickpea protein. In some embodiments, the legume protein consists of a lentil protein. In some embodiments, the legume protein consists of a lupin protein. In some embodiments, the legume protein consists of a pea protein. In any embodiment described herein, the legume protein comprises at least about 80% protein. Suitable legume proteins are readily available from any number of manufacturers.

In one embodiment, the whole grain protein is derived from rice. In any embodiment described herein, the whole grain protein comprises a rice protein, concentrate, oat protein, or any combination thereof. In any embodiment described herein, the whole grain protein comprises a rice protein isolate. In any embodiment described herein, the whole grain protein consists of a rice protein isolate. In any embodiment described herein, the whole grain protein comprises a rice protein concentrate. In any embodiment described herein, the whole grain protein consists of a rice protein concentrate. Suitable rice protein concentrates comprise, for example, at least about 80% protein. Suitable rice protein isolates comprise, for example, at least about 90% protein. Suitable whole grain proteins are readily available from any number of manufacturers. In some embodiments, the whole grain protein comprises between about 80% and about 90% protein.

In some embodiments, the dairy protein comprises a milk protein, a whey protein, sodium caseinate, or any combination thereof. In some embodiments, the dairy protein comprises a protein isolate. In some embodiments, the dairy protein comprises a protein concentrate. In some embodiments, the dairy protein comprises a milk protein isolate. In some embodiments, the dairy protein consists of a milk protein isolate. In some embodiments, the dairy protein comprises a milk protein concentrate. In some embodiments, the dairy protein consists of a milk protein concentrate. In some embodiments, the dairy protein comprises a whey protein isolate. In some embodiments, the dairy protein consists of a whey protein isolate. In some embodiments, the dairy protein comprises a whey protein concentrate. In some embodiments, the dairy protein consists of a whey protein concentrate. In any embodiment described herein comprising the dairy protein, the dairy protein comprises at least about 80% protein, based on a dry basis. Suitable milk protein isolates, for example, comprise between about 80% and about 85% protein. Suitable dairy proteins are readily available from any number of manufacturers.

In some embodiments, the plant protein blend comprises the legume protein, the whole grain protein, the wheat protein and a sacha inchi protein. These proteins may be present in any amounts described above, whether described individually or in combination with another protein. In some embodiments, the wheat protein comprises a minimum of about 90% protein. In some embodiments, the wheat protein comprises lightly hydrolyzed wheat protein and is rich in peptide-bonded glutamine. Sacha inchi, also known as an Inca nut or Inca-peanut is a perennial plant native to tropical South America and is rich in alpha-linolenic acid. In some embodiments, the sacha inchi protein comprises at least about 55% protein, on a dry basis.

In some embodiments comprising the legume protein, whole grain protein, and dairy protein, the plant protein blend comprises a viscosity ranging from about 20 cP to about 60 cP. In some embodiments comprising the legume protein, whole grain protein, and dairy protein, the plant protein blend comprises a viscosity ranging from about 25 cP to about 50 cP. In some embodiments comprising the legume protein, whole grain protein, and dairy protein, the plant protein blend comprises a viscosity ranging from about 30 cP to about 40 cP.

In some embodiments comprising the legume protein, the whole grain protein, and the wheat protein, and the sacha inchi protein, the plant protein blend comprises a viscosity ranging from about 20 cP to about 250 cP. In some embodiments comprising the legume protein, the whole grain protein, and the wheat protein, and the sacha inchi protein, the plant protein blend comprises a viscosity ranging from about 25 cP to about 225 cP. In some embodiments comprising the legume protein, the whole grain protein, and the wheat protein, and the sacha inchi protein, the plant protein blend comprises a viscosity ranging from about 50 cP to about 150 cP.

Referring back to FIG. 1, once the desired plant protein blend 5 is produced, a sweetening component 10 comprising one or more sweeteners is combined with the plant protein blend 5. Additional components or protecting agents to the beverage product 15 may also be combined with the plant protein blend 5 and the sweetening component 10. Components then undergo mixing to form a dry blend 20.

The sweetening component 10 can be nutritive or non-nutritive, natural or synthetic sweetener, or a combination of such sweeteners, so long as the sweetener(s) provides a taste that is perceived as sweet by the sense of taste. The sweeteners included in the beverages disclosed herein are edible consumables. The perception of flavoring agents and sweetening agents can depend to some extent on the interrelation of elements. Flavor and sweetness can also be perceived separately, i.e., flavor and sweetness perception can be both dependent upon each other and independent of each other. For example, when a large amount of a flavoring agent is used, a small amount of a sweetening agent can be readily perceptible and vice versa. Thus, the oral and olfactory interaction between a flavoring agent and a sweetening agent can involve the interrelationship of elements. When used to sweeten, the sweetener or combination of sweeteners in the beverage is present in an amount above the sweeteners' sweetness recognition threshold concentration. In certain embodiments, one or more nutritive sweeteners can be present in the beverage in an amount of from about 1% to about 20% by weight of the beverage, such as from about 3% to about 16% by weight, or from about 5% to about 12% by weight, depending upon the desired level of sweetness in the beverage composition. The term "sweetness recognition threshold concentration," as generally used herein, is the lowest known concentration of a given sweetener or combination of sweeteners that is perceivable by the human sense of taste, typically around about 1.5% sucrose equivalence. As used herein, "taste" refers to a combination of sweetness perception, temporal effects of sweetness perception, i.e., on-set and duration, off-tastes, e.g. bitterness and metallic taste, residual perception (aftertaste), and tactile perception, e.g. body and thickness.

In some embodiments, the sweetening component comprises a nutritive sweetener. In some embodiments, the sweetening component comprises a non-nutritive sweetener. In some embodiments, the sweetening component comprises a nutritive sweetener and a non-nutritive sweetener. In some embodiments, the sweetening component comprises a combination of one or more natural nutritive sweeteners, one or more artificial sweeteners, and/or one or more natural non-nutritive sweeteners. Suitable forms of non-nutritive and nutritive sweeteners are readily available from any number of manufacturers.

In some embodiments, the nutritive sweetener is sucrose, glucose, fructose, or any combination thereof. In some embodiments, the nutritive sweetener is high fructose corn syrup (HFCS), honey granules, or sugar. By way of example, the term "sugar" includes natural cane sugar made from sugar cane and/or granulated sugar made from either cane or sugar beets.

In some embodiments, the non-nutritive sweetener is a natural non-nutritive sweetener selected from the group consisting of rebaudioside A, rebaudioside B, rebaudioside C, rebaudioside D, rebaudioside M, iso-steviol glycosides, mogrosides, trilobatin, and combinations thereof. In some embodiments, the non-nutritive sweetener is rebaudioside A (Reb A), rebaudioside D (Reb D), rebaudioside M (Reb M), or any combination thereof (e.g., a mixture of Reb A and Reb D, a mixture of Reb D and Reb M, or a mixture of Reb A, Reb D, and Reb M). In some embodiments, the non-nutritive sweetener is stevia leaf blend. In some embodiments, the beverage comprises an artificial sweetener such as aspartame, sucralose, acesulfame potassium (ASK), or any combination thereof. In some embodiments, the sweetening component comprises a combination of stevia extract and sucrose. In some embodiments, the amount of sweetening component is made to ensure the ready-to-drink beverage product comprises about or less than about 10 grams of added sugar/8-ounce serving. In some embodiments, sufficient sweetening component is added to produce a ready-to-drink beverage product comprises a sweetness of about 16.5 grams of added sugar/8-ounce serving.

In some embodiments, the beverage can further include a supplemental sweetness enhancer in an amount sufficient to further enhance the sweetness of the sweetener but in an amount below the supplemental sweetness enhancer's sweetness recognition threshold concentration. Suitable supplemental sweetness enhancers are described herein. In some embodiments, the supplemental sweetness enhancer is D-psicose, erythritol, or a combination thereof. Other components suitable for inclusion in the beverage are described herein.

Referring back to FIG. 1, in some embodiments once the plant protein blend and sweetening component are selected, additional dry components 15 may also be added at this stage. For example, in some embodiments, buffering salts and stabilizers could be added to the dry blend. In some embodiments, buffering salts comprise dipotassium phosphate to provide protection to pH shifts that may occur in subsequent high temperature treatments, discussed below. In some embodiments, stabilizers may comprise hydrocolloids in an amount of up to about 2.5%, based on the total weight of the ready-to-drink beverage. In some embodiments, maltodextrin may be present in the dry blend at an amount of up to about 1.5%. Further embodiments of the dry blend 20 are further discussed below. In some embodiments, the dry blend may comprise a minor amount of gellan gum, such as no more than about 0.05% in the final product beverage.

Once dry components 5, 10, 15 are combined and mixed to form a dry blend 20, the dry blend 20 undergoes a hydrating step 25 prior to mixing step(s) 30 to produce a raw beverage base. The hydrating liquid 25 is an aqueous solution, which comprises water in some embodiments. In some embodiments, the hydrating liquid consists of water. In certain embodiments, a sufficient amount of water is added such that a ready-to-drink beverage comprises at least about 80% water.

Components may undergo one or more mixing steps as additional components are added to form the raw beverage base. In certain embodiments, the mixing to hydrate the dry blend is performed at temperatures ranging between about 15° C. and about 55° C. (59° F.-131° F.). In some embodiments, the mixing is performed between about 20° C. and about 45° C. (68° F.-113° F.). In some embodiments, the mixing step is performed at about 54° C. (130° F.). In some embodiments, additional components such as oil, lecithin and/or flavors are added followed by an additional mixing step(s) 35, which may comprise one or more mixing steps under high shear. In some embodiments, mixing comprises high shear mixing at speeds between about 300 and about 500 rpm for a sufficient time period so as to form a homogenous blend. In some embodiments, an oil/lecithin blend 35 may also be added simultaneous with the addition of water. In some embodiments, an oil/lecithin blend may be added after the addition of water, followed by the high shear mixing described above. In some embodiments, the oil comprises palm oil, canola oil, sunflower oil, high oleic oils, or any combination thereof. In some embodiments, the oil comprises a combination of palm oil and canola oil in a ratio of about 50:50. In some embodiments, the oil consists of palm oil. In some embodiments, the oil consists of canola oil. In some embodiments, the lecithin is a soy lecithin.

In some embodiments, a flavor component 40 may be added before or during mixing step(s) 30. In some embodiments, with each additional component, an additional high shear mixing step may be required. By way of example, a flavor, flavoring, or flavorant may include solid or liquid flavorants, and the like, used to deliver flavor, taste, seasoning or aroma to a beverage product, including without limitation a flavor masking agent, a sweetener modifier, a bitter modifier, a mouthfeel modifier, a texture modifier and the like. Exemplary flavorings include, but are not limited to, cola flavoring, citrus flavoring, spice flavorings, and combinations thereof. In certain embodiments, the beverage disclosed herein can contain a flavor composition, for example, natural, nature identical, and/or synthetic fruit flavors, botanical flavors, other flavors, and mixtures thereof. As used herein, the term "fruit flavor" refers generally to those flavors derived from the edible reproductive part of a seed plant including those plants wherein a sweet pulp is associated with the seed, e.g., tomato, cranberry, and the like, and those having a small, fleshy berry. The term berry includes true berries as well as aggregate fruits, i.e., not "true" berries, but fruit commonly accepted as such. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like. In some embodiments, the flavor component may comprise, for example, vanilla, strawberry, banana, chocolate, cocoa, desserts such as chocolate mousse, coffee, hazelnut, cinnamon, chai, horchata, almond, or any combination thereof.

Returning to FIG. 1, after the high shear mixing 30 to form the beverage base, the method comprises the step of subjecting the beverage base to a high temperature treatment 35 to soften a plant matrix of the plant protein blend. In some embodiments, the high temperature treatment step 35 comprises temperatures ranging between about 190° F. and about 290° F. In some embodiments, the high temperature treatment step 35 comprises a hold time of between about 5 seconds and about 30 seconds, depending on the available equipment. In some embodiments, the high temperature treatment 35 comprises indirect heating, that is, no direct contact between the heating medium and the product. Such heating ensures the method is free of flavor loss through volatilization. In some embodiments, the high temperature treatment system is a closed system. Following the high temperature treatment 35, the beverage base is subjected to a downstream homogenization step 40 to break down cooked plant particles and smooth the beverage base. The homogenizing step comprises a cold two-stage process comprising a first stage homogenization at a pressure between about 1,600 and about 2,400 psi, followed by a second stage homogenization at a pressure between about 400 and about 600 psi. Homogenizing 40 may be performed at temperatures ranging between about 145° F. and about 200° F., for example. In some embodiments, the homogenization is performed at temperatures between about 130° F. (54.4° C.) and about 160° F. (71.1° C.). Holding times may vary from between about 5 seconds and about 30 seconds, depending on the equipment and available hold tubes. During test runs a homogenizer pressure of 2000 psi/500 psi were used. After homogenizing 40, the beverage base undergoes cooling 45 to a temperature of about 90° F. (32.2° C.) prior to subsequent packaging and/or storing steps 50. In some embodiments, cooling occurs on ice prior to filling steps.

The beverage product generally comprises up to about 5% legume protein. In some embodiments, the beverage product comprises up to about 4% legume protein. In some embodiments, the beverage product comprises up to about 3% legume protein. In any embodiment described herein, the beverage product comprises between about 3% and about 5% legume protein. In some embodiments, the beverage product further comprises up to about 5% whole grain protein. In some embodiments, the beverage product comprises up to about 4% whole grain protein. In some embodiments, the beverage product comprises up to about 3% whole grain protein. In any embodiment described herein, the beverage product comprises between about 3% to about 5% whole grain protein.

In some embodiments comprising dairy protein, the beverage product may comprise between about 0.5% and about 4% dairy protein, based on an 8-oz. serving size. In some embodiments comprising dairy protein, the beverage product may comprise between about 1% and about 3% dairy protein. In any embodiment comprising a dairy protein, the beverage product comprises up to about 1.5% dairy protein. In some embodiments, the beverage product comprises up to about 1% dairy protein.

In embodiments comprising a wheat protein and a sacha inchi protein, such proteins may be present in the final beverage products in amounts of up to about 2% and amounts of up to 1.5%, respectively.

Beverage compositions described herein are free of food allergens, defined as those allergen commonly known to trigger an allergic reaction in a consumer. In some embodiments, the beverage compositions are free of nuts, almonds, and/or cashews. In some embodiments, the compositions are also free of soy and/or coconut. Prototypes produced using the methods described herein comprise good mouthfeel and a good balance of flavor and sweetness levels, with no chalkiness and very little grittiness. Protein blends described herein deliver up to 10 grams of complete protein per 8 fluid-ounce serving, in which the level of complete protein was calculated by multiplying the total protein content in the blend by the blend's PDCAAS. In some embodiments, beverages described herein comprise about 5 grams of complete protein per 8 fluid-ounce serving. In some embodiments, the beverages comprise about 10 grams of complete protein per 8 fluid-ounce serving.

In assessing the protein quality of the beverages described herein, protein digestibility-corrected amino acid score (PDCAAS) was used. PDCAAS is widely used as a routine assay for protein quality evaluation and has been adopted as the standard by which protein value is measured in human nutrition. The method is based on comparison of the concentration of the first limiting essential amino acid in the test protein with the concentration of that amino acid in a reference (scoring) pattern. This reference pattern is derived from the essential amino acid requirements of the preschool-aged child (i.e., 2-5 years of age). The chemical score obtained in this way is corrected for true fecal digestibility of the test protein. The 1989 Joint FAO/WHO Report contains the reference amino acid pattern for preschool-aged children, which is the default reference pattern used by the United States Food and Drug Administration for all PDCAAS calculations. For purposes of calculating the PDCAAS scores described herein, the 1989 Joint FAO/WHO Report is incorporated herein by reference. PDCAAS takes into account both amino acid profile and digestibility of the proteins using the following formula:

Limiting Amino Acid Score*Protein Digestibility=Protein Quality (PDCAAS)

Digestibility values are derived from animal feeding studies. Amino acid content is determined by analytical testing and is compared to the reference pattern. In other words, the PDCAAS is a measurement of protein quality. A PDCAAS of one describes a protein of the highest quality. A PDCAAS of zero describes a very poor quality protein. Thus, it is desirable to have the protein component utilized in the nutritional composition provide a PDCAAS as close to 1 or more as possible so that the protein can be sufficiently utilized by the body after digestion. A PDCAAS score of 1 indicates that after protein digestion, it provides, per unit of protein, 100% of the indispensible amino acids required. The presently described beverages comprise protein in the range of about 5-37.75 g (uncorrected) and 5-25 g (Complete, PDCAAS corrected). Not bound by any theory, the PDCAAS value for embodiments comprising the legume protein, the whole grain protein, and the dairy protein, the PDCAAS value of suitable beverage embodiments may be approximated to be at least 0.75. In other embodiments comprising the legume protein, the whole grain protein, and the dairy protein, the PDCAAS value of suitable beverage embodiments may be fairly approximated to be at least 0.93. Not bound by any theory, the PDCAAS value for embodiments comprising the legume protein, the whole grain protein, the wheat protein, and the sacha inchi protein, may be fairly approximated to be at least 0.59.

It should be understood that, where context allows, the term "amount" is interchangeable with "concentration." As used here, these terms should be understood to mean the amount of the component in question by weight of the total beverage product composition or final beverage formulation, unless otherwise stated. "By weight of the total beverage product composition" refers to the weight of the compound to the volume of beverage product composition.

As understood by those skilled in the art, the beverage in accordance with the disclosure herein can also include various other ingredients typically included in such beverage. In certain embodiments, preservatives can be added if desired or necessary, depending upon factors including the presence of other ingredients, production technique, desired shelf life, etc.

It should be understood that beverages in accordance with this disclosure can have any of numerous different specific formulations or constitutions. The formulation of a beverage product in accordance with this disclosure can vary, depending upon such factors as the product's intended market segment, its desired nutritional characteristics, flavor profile, and the like. For example, further ingredients can be added to the formulation of a particular beverage embodiment. Further ingredients include, but are not limited to, one or more additional sweeteners in addition to any sweetener already present, flavorings, electrolytes, vitamins, fruit juices or other fruit products, tastants, masking agents, flavor enhancers, carbonation, or any combination of the foregoing. These can be added to any of the beverage compositions to vary the taste, mouthfeel, and/or nutritional characteristics of the beverage composition.

Exemplary natural nutritive sweeteners suitable for use in the beverages herein include crystalline or liquid sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses; sorghum syrup, and mixtures thereof.

Other sweeteners suitable for use in the beverages herein include, but are not limited to, sugar alcohols such as erythritol, sorbitol, mannitol, xylitol, lactitol, isomalt, malitol, tagatose, trehalose, galactose, rhamnose, cyclodextrin, ribulose, threose, arabinose, xylose, lyxose, allose, altrose, mannose, idose, lactose, maltose, isotrehalose, neotrehalose, palatinose or isomaltulose, erythrose, deoxyribose, gulose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, and mixtures thereof.

Other sweeteners suitable for use in the beverages herein include rare sugars such as D-allose, D-psicose (also known as D-allulose), L-ribose, D-tagatose, L-glucose, L-fucose, L-arabinose, D-turanose, D-leucrose, and mixtures thereof.

Exemplary artificial sweeteners suitable for use in the beverages herein include, but are not limited to, saccharin, cyclamate, aspartame, neotame, advantame, acesulfame potassium, sucralose, and mixtures thereof.

Exemplary natural non-nutritive potent sweeteners suitable for use in the beverages herein include steviol glycosides (e.g., stevioside, steviolbioside, rebaudioside A, rebaudioside B, rebaudioside C, rebaudioside D, rebaudioside E, rebaudioside F, rebaudioside H, rebaudioside I, rebaudioside N, rebaudioside K, rebaudioside J, rebaudioside O, rebaudioside M, dulcoside A, rubusoside, iso-steviol glycosides such as iso-rebaudioside A, and mixtures thereof), Lo Han Guo powder, neohesperidin dihydrochalcone, trilobatin, glycyrrhizin, phyllodulcin, hernandulcin, osladin, polypodoside A, baiyunoside, pterocaryoside, thaumatin, monellin, monatin, mabinlins I and II, and mixtures thereof.

In other embodiments, sweeteners derived from fruit, such as Lo Han Guo (LHG) juice concentrate, can be used as a nutritive sweetener in the beverages herein. Other natural non-nutritive potent sweeteners, as described above or any mixture of any of those, can also be included in the beverages. LHG may be obtained from fruit of the plant family Cucurbitaceae, tribe Jollifieae, subtribe Thladianthinae, genus *Siraitia*. LHG often is obtained from the genus/species *S. grosvenorii, S. siamensis, S. silomaradjae, S. sikkimensis, S. africana, S. borneensis,* and *S. taiwaniana*. Suitable fruit includes that of the genus/species *S. grosvenorii*, which is often called Luo Han fruit. LHG contains triterpene glycosides or mogrosides, which constituents may be used as LHG sweeteners. LHG may be used as the juice or juice concentrate, powder, etc. LHG juice concentrate may contain about 3 wt. % to about 12 wt. %, e.g., about 6 wt. % mogrosides, such as mogroside V, mogroside IV, (11-oxo-mogroside V), siamenoside and mixtures thereof. LHG may be produced, for example, as discussed in U.S. Pat. No. 5,411,755. Sweeteners from other fruits, vegetables or plants also may be used as natural or processed sweeteners or sweetness enhancers in at least certain exemplary embodiments of the beverage products disclosed here.

In certain embodiments, combinations of one or more natural nutritive sweeteners, one or more artificial sweeteners, and/or one or more natural non-nutritive potent sweeteners can be used. The foregoing notwithstanding, it should also be recognized that any of the identified sweeteners can, either in addition or instead of, act as supplemental sweetness enhancers, masking agents, or the like, when used in amounts below its (or their) sweetness perception threshold. In certain embodiments, non-nutritive sweeteners can be present in the beverage composition in an amount ranging from about 1 ppm to about 600 ppm, depending upon the particular non-nutritive sweetener(s) being used and the desired level of sweetness in the beverage composition.

In certain embodiments, a supplemental sweetness enhancer can be present at a concentration below its sweetness recognition threshold concentration. For example, and in certain embodiments, the beverage can contain up to about 2 weight percent each of D-psicose, erythritol, or combination thereof. In some embodiments, D-psicose and/or erythritol can be present in an amount ranging from about 0.5 to about 2.0 weight percent. Alternatively, D-psicose can be present in an amount ranging from about 0.5 to about 2.0 weight percent and erythritol can be present in an amount ranging from about 0.5 to about 1 weight percent.

Suitable supplemental sweetness enhancers include any of those known in the art. Exemplary supplemental sweetness enhancers include, but are not limited to, D-psicose, erythritol, iso-rebaudioside A, rebaudioside B, rebaudioside C, rubusoside, trilobatin, phyllodulcin, brazzein, and/or mogrosides.

In some embodiments, the supplemental sweetness enhancer is a rare sugar supplemental sweetness enhancer. Exemplary rare sugars include D-psicose (also referred to as D-allulose), D-allose, L-ribose, D-tagatose, L-glucose, L-fucose, L-arabinose, D-turanose, D-leucrose, and mixtures thereof.

In some embodiments, the supplemental sweetness enhancer is a non-nutritive natural enhancer. Suitable non-nutritive natural enhancers include steviol glycosides. Suitable steviol glycosides, include, but are not limited to, stevioside, rebaudioside A, rebaudioside B, rebaudioside C, rebaudioside D, rebaudioside E, rebaudioside F, rebaudioside H, rebaudioside I, rebaudioside N, rebaudioside K, rebaudioside J, rebaudioside O, rebaudioside M, rubusoside, dulcoside A, iso-steviol glycosides such as iso-rebaudioside A, and mixtures thereof. In a particular embodiment, the supplemental sweetness enhancer can be rubusoside, rebaudioside C or rebaudioside B. In other embodiments, the non-nutritive natural enhancer supplemental sweetness enhancer can be a mogrol glycoside. Suitable mogrol glycosides, include, but are not limited to, mogroside V, iso-mogroside, mogroside IV, siamenoside, and mixtures thereof.

In some embodiments, the supplemental sweetness enhancer is a sugar alcohol supplemental sweetness enhancer. Suitable sugar alcohols include erythritol, sorbitol, mannitol, xylitol, lactitol, isomalt, malitol, and mixture thereof.

In some embodiments, the supplemental sweetness enhancer is a FEMA GRAS supplemental sweetness enhancers. Suitable FEMA GRAS enhancers include, but are not limited to, FEMA GRAS enhancer 4802, FEMA GRAS enhancer 4469, FEMA GRAS flavor 4701, FEMA GRAS enhancer 4720 (rebaudioside C), FEMA GRAS flavor 4774, FEMA GRAS enhancer 4708, FEMA GRAS enhancer 4728, FEMA GRAS enhancer 4601 (rebaudioside A) and combinations thereof.

In some embodiments, the supplemental sweetness enhancer is a salt based (e.g., NaCl) or benzoic acid based sweetness enhancer. Other suitable supplemental sweetness enhancers are known in the art, including, for example, those described in U.S. Patent Application Publication No. 2014/0272068, along with U.S. Pat. Nos. 9,717,267, 8,754,088, and 8,877,922.

Juices suitable for use in certain exemplary embodiments of the beverages or beverage concentrates disclosed herein include, e.g., fruit, vegetable and berry juices. Juices may be employed in the present beverages in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a concentrate or beverage having a desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, mandarin, melon, watermelon, and grapefruit. Numerous additional and alternative juices suitable for use in at least certain exemplary embodiments will be apparent to those skilled in the art given the benefit of this disclosure. In the compositions of the present disclosure employing juice, juice can be used, for example, at a level of at least about 0.2 weight percent of the composition. In certain embodiments juice can be employed at a level of from about 0.2 weight percent to about 40 weight percent. In further embodiments, juice can be used, if at all, in an amount ranging from about 1 weight percent to about 20 weight percent.

Juices that are lighter in color can be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavored and decolored juices can be employed if desired.

Other flavorings suitable for use in at least certain exemplary embodiments of the beverages disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings may be in the form of an extract, oleoresin, juice concentrate, bottler's base, or other forms known in the art. In at least certain exemplary embodiments, such spice or other flavors complement that of a juice or juice combination.

The one or more flavorings may be used in the form of an emulsion. A flavoring emulsion can be prepared by mixing some or all of the flavorings together, optionally together with other ingredients of the beverage, and an emulsifying agent. The emulsifying agent can be added with or after the flavorings mixed together. In certain exemplary embodiments, the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments, the emulsifier is from about 5% to about 30% of the mixture.

Carbon dioxide can be used to provide effervescence to certain exemplary embodiments of the beverages disclosed here. Any of the techniques and carbonating equipment known in the art for carbonating beverages can be employed. Carbon dioxide can enhance beverage taste and appearance and may aid in safeguarding the beverage purity by inhibiting and/or destroying objectionable bacteria. In certain embodiments, for example, the beverage can have a $CO_2$ level up to about 4.0 volumes carbon dioxide. Other embodiments can have, for example, from about 0.5 volume to about 5.0 volumes of carbon dioxide. As used herein, one volume of carbon dioxide refers to the amount of carbon dioxide absorbed by a given quantity of a given liquid, such as water, at 60° F. (16° C.) and one atmospheric pressure. A volume of gas occupies the same space as does the liquid by which it is dissolved. The carbon dioxide content can be selected by those skilled in the art based on the desired level of effervescence and the impact of the carbon dioxide on the taste or mouthfeel of the beverage.

In certain embodiments, caffeine can be added to any of the disclosed beverages described herein. The amount of caffeine added can be determined by the desired properties of a given beverage, and any applicable regulatory provisions of the country where the beverage is marketed. In certain embodiments caffeine can be included in an amount sufficient to provide a final beverage product having less than about 0.02 weight percent caffeine. The caffeine must be of purity acceptable for use in beverages. The caffeine may be natural or synthetic in origin.

The beverage products disclosed here can contain additional ingredients, including, generally, any of those typically found in beverage formulations. Examples of such additional ingredients include, but are not limited to, caramel and other coloring agents or dyes, foaming or antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), B2 (riboflavin), B6, B12, K, niacin, folic acid, biotin, and combinations thereof. The optional non-mineral nutritional supplements are typically present in amounts generally accepted under good manufacturing practices. Exemplary amounts can be between about 1% and about 100% Recommended Daily Value (RDV), where such RDVs are established. In certain exemplary embodiments, the non-mineral nutritional supplement ingredient(s) can be present in an amount between about 5% and about 20% RDV, where established.

Preservatives may be used in at least certain embodiments of the beverages or beverage concentrates disclosed here. That is, at least certain exemplary embodiments can contain an optional dissolved preservative system. Solutions with a pH below 4 and especially those below 3 typically are "micro-stable," i.e., they resist growth of microorganisms, and so are suitable for longer term storage prior to consumption without the need for further preservatives. In an exemplary embodiment the solution is about 3.8 to about 4.2 pH. However, an additional preservative system can be used if desired. If a preservative system is used, it can be added to the product at any suitable time during production, e.g., in some cases prior to the addition of sweeteners. As used here, the terms "preservation system" or "preservatives" include all suitable preservatives approved for use in beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives may be used in amounts not exceeding mandated maximum levels under applicable laws and regulations.

The level of preservative used can be adjusted according to the planned final product pH and/or the microbiological spoilage potential of the particular beverage formulation. The maximum level employed typically is about 0.05 weight percent of the beverage. It will be within the ability of those skilled in the art, given the benefit of this disclosure, to select a suitable preservative or combination of preservatives for beverages according to this disclosure.

Suitable antioxidants may be selected from the group consisting of rutin, quercetin, flavonones, flavones, dihydroflavonols, flavonols, flavandiols, leucoanthocyanidins, flavonol glycosides, flavonone glycosides, isoflavonoids, and neoflavonoids. In particular, the flavonoids may be, but not limited to, quercetin, eriocitrin, neoeriocitrin, narirutin, naringin, hesperidin, hesperetin, neohesperidin, neoponcirin, poncirin, rutin, isorhoifolin, rhoifolin, diosmin, neodiosmin, sinensetin, nobiletin, tangeritin, catechin, catechin gallate, epigallocatechin, epigallocatechin gallate, oolong tea polymerized polyphenol, anthocyanin, heptamethoxyflavone, daidzin, daidzein, biochaminn A, prunetin, genistin, glycitein, glycitin, genistein, 6,7,4' trihydroxy isoflavone, morin, apigenin, vitexin, balcalein, apiin, cupressuflavone, datiscetin, diosmetin, fisetin, galangin, gossypetin, geraldol, hinokiflavone, primuletin, pratol, luteolin, myricetin, orientin, robinetin, quercetagetin, and hydroxy-4-flavone.

Suitable food grade acids are water soluble organic acids and their salts and include, for example, phosphoric acid, sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations of any of them. Such acids are suitable for adjusting the pH of the beverage.

Suitable food grade bases are sodium hydroxide, potassium hydroxide, and calcium hydroxide. Such bases also are suitable for adjusting the pH of a beverage.

The formulations and compositions described herein are now further detailed with reference to the following examples. These examples are provided for the purpose of illustration only and the embodiments described herein should in no way be construed as being limited to these examples. Rather, the embodiments should be construed to encompass any and all variations, which become evident as a result of the teaching provided herein.

Example 1—Processing of a Plant Protein Blend Beverage with Vanilla Flavor

A plant protein blend of pea protein isolate, rice protein isolate, and milk protein isolate was created to produce a plant protein blend comprising approximately 37% milk protein isolate, with the remainder of the plant protein blend composition comprising equal amounts of pea and rice proteins. During some test runs, the pea protein comprised an amino acid profile with a total glutamic acid level of about 17% glutamic acid, about 12% aspartic acid, about 9% arginine, about 9% leucine, and about 7.5% lysine; while the milk protein isolate comprised an amino acid profile with a total glutamic acid level of about 21% glutamic acid, about 9.5% arginine, about 9.5% leucine, about 7% aspartic acid, and about 7% lysine. To the plant protein blend, a sweetening component, gellan gum and dipotassium phosphate, cellulose, and carrageenan were added before adding about 88% reverse osmosis water, followed by a first mixing step with a whisk and then a second mixing step under high shear for about 5 minutes. An oil/lecithin blend in an approximate ratio of 2:0.1 was added to the hydrated blend, followed by additional high shear mixing for about 5 minutes. Flavor was then added to the beverage base followed by another round of high shear mixing for about 30 seconds. The raw beverage base (of an initial temperature of between about 70 and 75° F.) then underwent a high temperature treatment, homogenizing, and cooling steps as shown, by way of example, in FIG. 2. High shear mixing steps typically comprise mixing at a minimum of about 1700 rpm. It may be appreciated that the rotational speed may vary based on the configuration of the equipment, for example, the type and size of the high mixer head. By way of example, the high shear mixer may have a maximum speed of 3450 rpm depending the capacity of the mixer.

Figure 2:
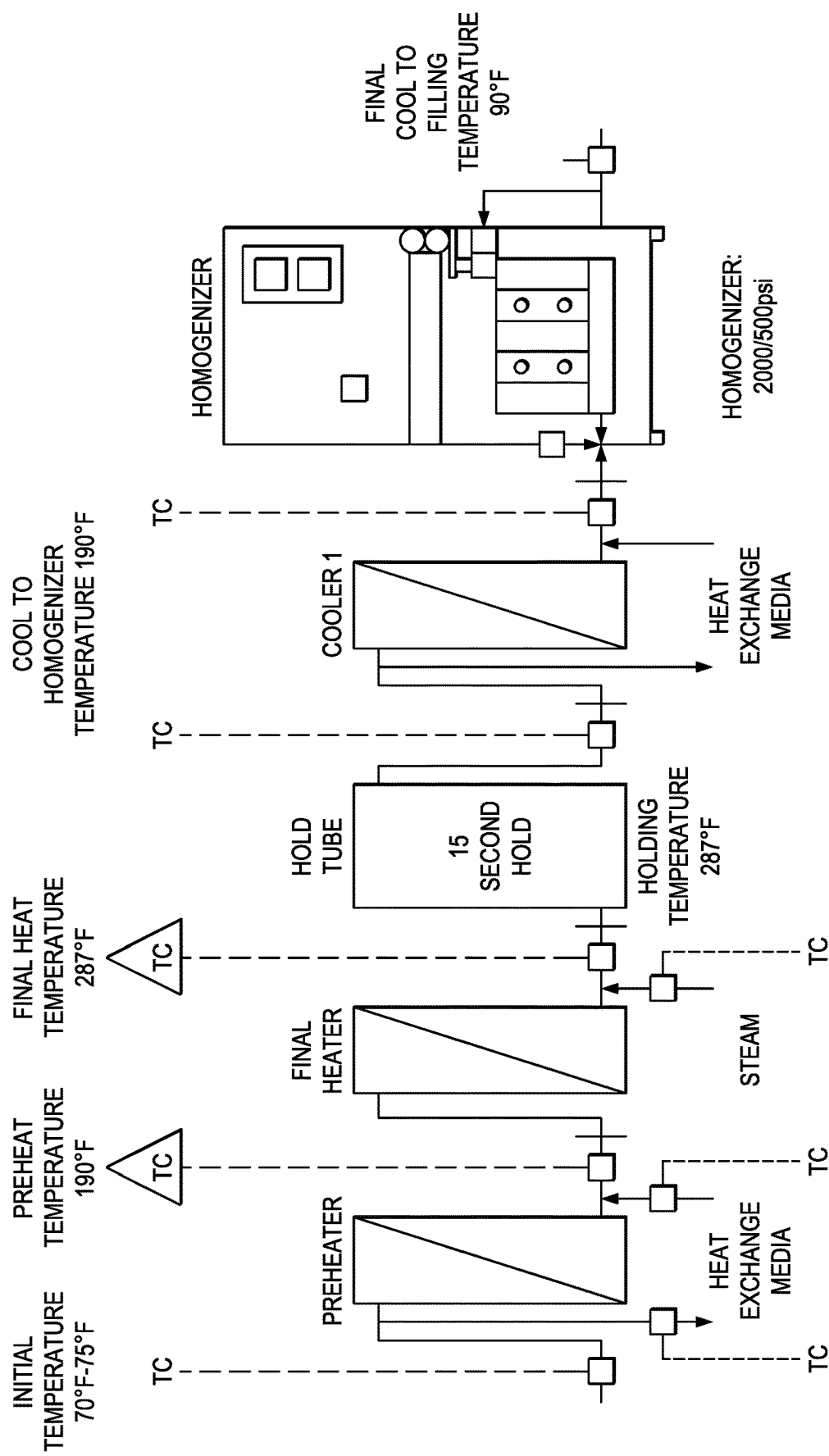
FIG. 2 depicts one embodiment of a set-up for a high temperature treatment step described in FIG. 1.

As shown in FIG. 2, the base was subjected to a preheater 100 set to a temperature of about 190° F. (about 87.8° C.), followed by a final heater 110 comprising steam, at a temperature of about 287° F. (about 141.7° C.). Following the final heater 110, the base was subjected to a holding temperature of about 287° F. for about 15 seconds 120. Subsequent cooling 130 comprised a cooler at a temperature of about 190° F., following by homogenizing step 140 as described above, to stabilize the oil-in-water emulsion. Cooling to a filling temperature of 90° F. (32.2° C.) then took place prior to filling sanitized bottles, which were further cooled prior to labeling and refrigerated storing. The final plant protein based beverage product comprised about 0.6% hydrocolloids and a thick, full mouthfeel.

Example 2—Processing of a Plant Protein Blend Beverage with Cocoa

A plant protein blend of pea protein isolate, rice protein isolate, and wheat protein, and sacha inchi protein concentrate was created to produce a plant protein blend comprising approximately 16.2% wheat protein, 11.5% sacha inchi protein, and the remainder comprising substantially equal (e.g., no more than 0.5% difference) parts pea and rice proteins. To the plant protein blend, a sweetening component, dipotassium phosphate, gellan gum, cellulose, and carrageenan were added before about 84% reverse osmosis water was used to hydrate the dry blend. Oil and lecithin (about 1:0.1) were then added using mixing steps as described in Example 1, which included the subsequent mixing in of a cocoa flavor. The hydrated blend then underwent the sequential high temperature treatment, homogenizing, cooling, and filling steps described in Example 1, above.

Additional Embodiments

The following descriptive embodiments are offered as further support of the disclosed invention:

In a first embodiment, novel aspects described in the present disclosure are directed to method of making a beverage product, comprising: mixing a plant protein blend with a sweetening component to form a dry blend, said plant protein blend comprising a legume protein, a whole grain protein, and a dairy or wheat protein; hydrating the dry blend; mixing the hydrated dry blend, thereby forming a beverage base; subjecting the beverage base to a high temperature treatment; homogenizing the beverage base at temperatures of at least about 190° F.; and cooling the beverage base.

In another aspect of the first embodiment, the method of making a beverage product, comprising: mixing a plant protein blend with a sweetening component to form a dry blend, said plant protein blend comprising a legume protein, a whole grain protein, and a dairy or wheat protein; hydrating the dry blend; mixing the hydrated dry blend, thereby forming a beverage base; subjecting the beverage base to a high temperature treatment; homogenizing the beverage base at temperatures of at least about 190° F.; cooling the beverage base; and further comprising one or more limitations selected from the following:

wherein the homogenizing step comprises a cold two-stage process;

wherein the cold two-stage process comprises a first stage homogenization at a first pressure between about 1,600 and about 2,400 psi, followed by a second stage homogenization at about a second pressure between 400 and about 600 psi;

wherein the hydrating step is performed at a temperature of between about 15° C. and about 50° C.;

wherein the beverage base comprises up to about 5% legume protein after the mixing;

wherein the legume protein comprises chickpea, lentil, lupin, pea, or any combination thereof;

wherein the beverage base comprises up to about 5% whole grain protein after the mixing;

wherein the protein blend comprises substantially equal amounts of the legume protein and the whole grain protein;

wherein the whole grain protein comprises a rice protein isolate;

wherein the dairy protein comprises a milk protein isolate;

wherein the beverage base comprises up to about 1.5% milk protein isolate after mixing;

wherein the protein blend comprises the wheat protein and a sacha inchi protein;

wherein the high temperature treatment comprises pre-heating at a first temperature between about 150 and about 230° F., followed by a subsequent heating at a second temperature between about 223 and about 300° F., the subsequent heating further comprising a hold time of at least about 10 seconds;

wherein the cooling step comprises cooling the beverage base to temperatures between about 50° F. to about 89° F.; and packaging the beverage base and storing the beverage base at refrigerated temperatures of less than about 44° F.

In a second embodiment, novel aspects of the present disclosure are directed to a ready-to-drink beverage product comprising a plant protein blend, said plant protein blend comprising a legume protein, a whole grain protein, and a dairy or wheat protein.

In another aspect of the second embodiment, novel aspects of the present disclosure are directed to a ready-to-drink beverage product comprising a plant protein blend, said plant protein blend comprising a legume protein, a whole grain protein, a dairy or wheat protein, and further comprising one or more limitations selected from the following:

substantially equal amounts of the legume protein and the whole grain protein;

wherein the legume protein comprises one or more of chickpea, lentil, lupin, and pea;

up to about 5% whole grain protein;

up to about 5% legume protein;

the whole grain protein comprising rice;

wherein the dairy protein comprises a milk protein isolate;

up to about 1.5% milk protein isolate;

up to about 2% wheat protein;

wherein the plant protein blend comprises the wheat protein and a sacha inchi protein;

up to about 1.5% sacha inchi protein;

a viscosity ranging from about 15 cP to about 65 cP;

a sweetening component;

wherein the sweetening component comprises sucrose, low calorie sweeteners, zero calorie sweeteners, natural sweeteners, or any combination thereof;

a flavor component;

an amount of hydrocolloids of up to about 2.5%;

an amount of maltodextrin of up to about 1.5% maltodextrin; and up to about 2% fat.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, it should be understood that the method steps described herein are exemplary, and upon reading the present disclosure, a skilled person would understand that one or more method steps described herein can be combined, omitted, re-ordered, or substituted.

As used herein, examples of "about" and "approximately" include a specified value or characteristic to within plus or minus 15, 10, 5, 4, 3, 2, or 1% of the specified value or characteristic. As used herein, examples using the term "between" include end points. For example, a range between 1 and 5 include 1 and 5 along with all other values greater than 1 and less than 5.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of making a liquid beverage product, comprising the following sequential steps:

mixing a plant protein blend comprising (i) from about 30 wt.% to about 38 wt.% of a legume protein that contains at least about 80% protein, (ii) from about 30 wt.% to about 38 wt.% of a whole grain protein that contains between about 80% to 90% protein, and (iii) from about 35 wt.% to about 40 wt.% of a dairy protein that contains at least about 80% protein or from about 14 wt.% to about 18 wt.% of wheat protein that contains at least about 90% protein with a sweetening component to form a dry blend having a viscosity ranging from about 20 cP to about 250 cP, wherein the legume protein and the whole grain protein are present in substantially equal amounts;

hydrating the dry blend;

mixing the hydrated dry blend, thereby forming a beverage base;

subjecting the beverage base to a high temperature treatment;

homogenizing the beverage base using a two-stage process where a first stage is conducted at a pressure greater than a second stage;

cooling the beverage base to a temperature between about 50° F. to about 89° F. to provide a beverage base that includes from about 3% to about 5% legume protein, from about 3% to about 5% whole grain protein, and from about 5 to about 10 grams complete protein per eight fluid ounce of beverage base; and, packaging the cooled beverage base.

2. The method of claim 1 wherein the two-stage process comprises the first stage homogenization at a first pressure between about 1,600 and about 2,400 psi, followed by the second stage homogenization at a second pressure between about 400 and about 600 psi.

3. The method of claim 1 wherein the hydrating step is performed at a temperature of between about 15° C. and about 50° C.

4. The method of claim 1 wherein the high temperature treatment comprises pre-heating at a first temperature between about 150 and about 230° F., followed by a subsequent heating at a second temperature between about 223 and about 300° F., the subsequent heating further comprising a hold time of at least about 10 seconds.

5. The method of claim 1 further comprises storing the packaged beverage base at refrigerated temperatures of less than about 44° F.

6. A ready-to-drink beverage product comprising a liquid beverage product according to claim 1.

7. The ready-to-drink beverage product of claim 6 wherein the legume protein comprises one or more of chickpea, lentil, lupin, and pea.

8. The ready-to-drink beverage product of claim 6 the whole grain protein comprising rice.

9. The ready-to-drink beverage product of claim 6 wherein the dairy protein comprises a milk protein isolate.

10. The ready-to-drink beverage product of claim 9 comprising up to about 1.5% milk protein isolate.

11. The ready-to-drink beverage product of claim 6 comprising up to about 2% wheat protein.

12. The ready-to-drink beverage product of claim 6 wherein the plant protein blend comprises the wheat protein and a sacha inchi protein.

13. The ready-to-drink beverage product of claim 12 comprising up to about 1.5% sacha inchi protein.

14. The ready-to-drink beverage product of claim 6 comprising a viscosity ranging from about 15 cP to about 65 cP.

15. The method of claim 1 wherein the beverage base contains from about 35 wt.% to about 40 wt.% of a dairy protein that contains at least about 80% protein.

\* \* \* \* \*